United States Patent
Koseoglu et al.

(10) Patent No.: US 11,370,980 B2
(45) Date of Patent: Jun. 28, 2022

(54) RECYCLE CATALYTIC REFORMING PROCESS TO INCREASE AROMATICS YIELD

(71) Applicant: Saudi Arabian Oil Company, Dhahran (SA)

(72) Inventors: Omer Refa Koseoglu, Dhahran (SA); Robert Peter Hodgkins, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 36 days.

(21) Appl. No.: 16/944,494

(22) Filed: Jul. 31, 2020

(65) Prior Publication Data
US 2022/0033721 A1    Feb. 3, 2022

(51) Int. Cl.
 *C10G 59/02*    (2006.01)
(52) U.S. Cl.
 CPC ..... *C10G 59/02* (2013.01); *C10G 2300/1044* (2013.01); *C10G 2300/4006* (2013.01); *C10G 2300/4012* (2013.01); *C10G 2300/4018* (2013.01); *C10G 2400/30* (2013.01)
(58) Field of Classification Search
 CPC ............ C10G 59/02; C10G 2300/1044; C10G 2300/4006; C10G 2300/4012; C10G 2300/4018; C10G 2400/30
 See application file for complete search history.

(56) References Cited

U.S. PATENT DOCUMENTS

| | | |
|---|---|---|
| 3,939,221 A | 2/1976 | Pearce |
| 4,041,091 A | 8/1977 | Henry |
| 4,070,408 A | 1/1978 | Vickers |
| 5,865,986 A * | 2/1999 | Buchanan ............... C10G 59/02 208/65 |
| 5,877,385 A | 3/1999 | Lee et al. |
| 6,004,452 A | 12/1999 | Ash et al. |
| 6,398,947 B2 | 6/2002 | Beck et al. |
| 9,447,682 B2 | 9/2016 | Kanj et al. |
| 9,453,159 B2 | 9/2016 | Kanj et al. |
| 9,464,034 B2 | 10/2016 | Kanj et al. |
| 9,469,599 B2 | 10/2016 | Kanj et al. |
| 9,528,045 B2 | 12/2016 | Kanj et al. |

(Continued)

FOREIGN PATENT DOCUMENTS

EP    287718 A1    10/1988

OTHER PUBLICATIONS

Doherty et al. ("Distillation (Section 13), Perry's Chemical Engineering Handbook." McGraw-Hill Companies, Inc., New York (2008)) (Year: 2008).*

(Continued)

*Primary Examiner* — Youngsul Jeong
*Assistant Examiner* — Jason Y Chong
(74) *Attorney, Agent, or Firm* — Dinsmore & Shohl

(57) ABSTRACT

The invention relates to a process and system arrangement to generate benzene, toluene and xylenes in a refinery. The process relies on recycling a $C_{9+}$ aromatic bottoms stream from an aromatic recovery complex back to rejoining a hydrotreated naphtha stream as it enters a catalytic reformer. The aromatic bottoms can be further reacted through both the reformer and the subsequent aromatic recovery complex to transform to higher value compounds, thereby reducing waste or reducing bottoms' presence in gasoline pools.

19 Claims, 5 Drawing Sheets

(56) References Cited

U.S. PATENT DOCUMENTS

| | | | |
|---|---|---|---|
| 10,047,283 B2 | 8/2018 | Kanj et al. | |
| 10,053,401 B1 | 8/2018 | Beadle et al. | |
| 10,071,939 B2 | 9/2018 | Abudawoud | |
| 10,093,873 B2 | 10/2018 | Koseoglu et al. | |
| 10,099,974 B2 | 10/2018 | Bilaus et al. | |
| 10,119,072 B2 | 11/2018 | Kanj et al. | |
| 10,294,172 B2 | 5/2019 | Beadle et al. | |
| 10,508,066 B2 | 12/2019 | Koseoglu et al. | |
| 10,526,554 B2 | 1/2020 | D'Acosta et al. | |
| 2001/0001448 A1 | 5/2001 | Kapoor et al. | |
| 2005/0228203 A1 | 10/2005 | Manzer | |
| 2005/0228204 A1 | 10/2005 | Manzer | |
| 2013/0144097 A1 | 6/2013 | Bender et al. | |
| 2014/0323788 A1 | 10/2014 | Richmond | |
| 2015/0166436 A1 | 6/2015 | Noe | |
| 2015/0251973 A1 | 9/2015 | Finger et al. | |
| 2015/0299086 A1 | 10/2015 | Farha et al. | |
| 2016/0045841 A1 | 2/2016 | Kaplan et al. | |
| 2016/0264495 A1* | 9/2016 | Molinier | C07C 5/2702 |
| 2017/0362143 A1 | 12/2017 | Bilaus et al. | |
| 2018/0029957 A1 | 2/2018 | Bouchy | |
| 2018/0066197 A1 | 3/2018 | Koseoglu et al. | |
| 2018/0079701 A1 | 3/2018 | Gattupalli et al. | |
| 2018/0170831 A1 | 6/2018 | Jan et al. | |
| 2020/0039898 A1 | 2/2020 | Koseoglu et al. | |
| 2020/0062675 A1 | 2/2020 | Koseoglu et al. | |

OTHER PUBLICATIONS

U.S. Office Action dated Oct. 14, 2021 pertaining to U.S. Appl. No. 16/944,394, filed Jul. 31, 2020, 13 pages.

International Search Report and Written Opinion dated May 26, 2021 pertaining to International application No. PCT/US2021/017378 filed Feb. 10, 2021, 14 pages.

Office Action dated Jun. 24, 2021 pertaining to U.S. Appl. No. 16/944,394, filed Jul. 31, 2020, 20 pages.

International Search Report and Written Opinion dated Apr. 6, 2021 pertaining to International application No. PCT/US2020/062795 filed Dec. 2, 2020, 14 pgs.

Aslan et al "Non-monotonicity of Contact Angle from NaCl and MgCl2 Concentrations in two Petroleum Fluids on Atomistically Smooth Surfaces" Department of Chemical & Environmental Engineering, Yale University, 2016, 25 pgs.

Hussain et al "Effect of the number of ethylene oxide units on the properties of synthesized tailor-made cationic gemini surfactants for oilfield applications" Journal of Molecular Structure 1196 (2019) 851-860, 10 pgs.

Jarrahian et al "Wettability alteration of carbonate rocks by surfactants: A mechanistic study" Colloids and Surfaces A: Physicochem. Eng. Aspects 410 (2012) 1-10, 10 pgs.

Kanj et al "Industry First Field Trial of Reservoir Nanoagents" SPE 142592, 2011, 10 pgs.

Kanj et al "Oil Industry First Field Trial of Inter-Well Reservoir Nanoagent Tracers" Proc. of SPIE vol. 9467, 2015, 5 pgs.

Wang et al "Investigation of the Effect of Temperature and Pressure on Wettability Using Modified Pendant Drop Method" SPE 30544, 1995, 10 pgs.

Wasan et al "Spreading of nanofludis on solids" Nature Publishing Group, vol. 423, 2003, 4 pgs.

U.S. Office Action dated Mar. 10, 2022 pertaining to U.S. Appl. No. 16/944,394, filed Jul. 31, 2020, 10 pages.

* cited by examiner

RECYCLE CATALYTIC REFORMING PROCESS TO INCREASE AROMATICS YIELD

TECHNICAL FIELD

The present disclosure generally relates to processes and systems for the recycling or recirculation of a $C_{9+}$ hydrocarbon aromatic bottoms stream to a catalytic reformer to improve recovery of high value product within a refinery complex.

BACKGROUND

Refinery products used for producing fuels receive increasing levels of attention, particularly with respect to minimizing waste and emissions. National and international concerns and regulations continue to evolve concerning gasoline specifications, and automakers have further set limitations for gasoline and diesel to allow them to provide vehicles that produce minimal emissions over their lifetime. Goals are set such as maximum levels for sulfur, aromatics, and benzene levels of 10 ppmw (parts per million per weight), 35 V %, and 1 V % or less, respectively.

When the use of lead to increase octane was phased out due to environmental concerns, no direct gasoline substitute existed, and refiners instead looked to convert certain hydrocarbon molecules to higher octane ratings. Catalytic reforming of naphtha is now a widely used process for refining hydrocarbon mixtures to increase the yield of higher octane gasoline.

In a typical refinery, naphtha is reformed after hydrodesulfurization to increase the octane number of the gasoline. The naphtha reformate, however, contains a high level of benzene, up to or above 10 V % in reformate. However, no more than 1-3 V % or less can be present in typical gasoline pools. Methods to remove benzene from reformate currently exist, including separation processes and hydrogenation reaction processes. In separation processes, benzene is typically extracted with a solvent and then separated from the solvent through a membrane separation unit or other suitable unit operation. In hydrogenation reaction processes, the reformate is divided into fractions to concentrate the benzene followed by hydrogenation of one or more of the benzene-rich fractions.

In a typical catalytic reforming unit, a naphtha stream is first hydrotreated in a hydrotreating unit to produce a hydrotreated naphtha stream. The hydrotreating unit operates under conditions (e.g., temperature, pressure, hydrogen partial pressure, liquid hourly space velocity (LHSV), catalyst selection/loading) that are effective to remove at least enough sulfur and nitrogen to meet requisite specifications. For instance, hydrotreating in conventional naphtha reforming systems generally occurs under relatively mild conditions that are effective to lower sulfur and nitrogen to less than 0.5 ppmw levels.

The hydrotreated naphtha stream is then reformed in a reforming unit to produce a gasoline reformate product stream. In general, the operating conditions for the catalytic naphtha reforming unit include a temperature in the range of from about 260° C. to about 560° C., a pressure in the range of from about 1 bar to about 50 bars, and a LHSV in the range of from about 0.5 h$^{-1}$ to about 40 h$^{-1}$.

In the catalytic reforming process, paraffins (alkanes) and naphthenes (cycloalkanes) are restructured to produce isomerized paraffins and aromatics of relatively higher octane numbers. Aromatics are left essentially unchanged or some may be hydrogenated to form naphthenes due to reverse reactions taking place in the presence of hydrogen. The reactions involved in catalytic reforming are commonly grouped into the four categories of cracking, dehydrocyclization, dehydrogenation and isomerization in parallel. A particular hydrocarbon/naphtha feed compound may undergo more than one form of reaction and/or may form more than one product. The catalysts for catalytic reforming processes are either mono-functional or bi-functional reforming catalysts that contain precious metals, such as IUPAC Groups 8-10, as active components. A bi-functional catalyst features both metal and acidic sites. Refineries generally use a platinum catalyst or platinum alloy supported on alumina as the reforming catalyst. The resulting reformate is sent to the gasoline pool to be blended with other gasoline components to meet the specifications. A typical gasoline blending pool includes $C_4$ and heavier hydrocarbons that have boiling points of less than about 205° C.

The hydrocarbon/naphtha feed composition, the impurities present therein, and the desired products determine the processing parameters with regard to choice of catalyst(s), process type etc. Particular types of chemical reactions can be targeted through a selection of catalyst or operating conditions known to those of ordinary skill in the art to influence both yield and selectivity of conversion of paraffinic and naphthenic hydrocarbon precursors to particular aromatic hydrocarbon structures.

SUMMARY

The reformate is usually sent to an aromatics recovery complex (ARC) where it undergoes several further processing steps in order to recover high value products, such as xylenes and benzene, and to convert lower value products, such as toluene, into higher value products. Aromatics present in the reformate are usually separated into different fractions by carbon number; for example benzene, toluene, xylenes, and ethylbenzene, etc. The $C_8$ fraction is subjected to a processing scheme to make more high value para-xylene by separating the para-xylene from the ortho-xylene, meta-xylene, and ethylbenzene using selective adsorption or crystallization. The ortho-xylene and meta-xylene remaining after para-xylene separation are isomerized to produce an equilibrium mixture of xylenes. The ethylbenzene is isomerized into xylenes or is dealkylated to benzene and ethane. The para-xylene is then again separated with the remaining para-xylene-depleted-stream being recycled to extinction through the isomerization unit and then to the para-xylene recovery unit until all are converted to para-xylene and recovered.

Toluene is typically recovered as a separate fraction and converted into higher value products, such benzene and/or xylenes through conversion processes such as disproportionation of toluene to make benzene and xylenes. Further processes involve hydrodealkylation of toluene to make benzene. Both toluene disproportionation and toluene hydrodealkylation result in the formation of benzene.

However, with current and future anticipated environmental regulations involving benzene, it is desirable that the toluene conversion not result in the formation of significant quantities of benzene. The problem faced by refineries is now how to most economically reduce benzene content in the reformate products sent to the gasoline pool by modifying the processes and apparatus of existing systems practicing the prior art processes described above.

Currently, the aromatics bottoms from an ARC is currently added to the gasoline fraction, although it has very high final boiling point, as it is a small volume. However, it deteriorates the gasoline quality and in the long run impacts the engine performance negatively. Therefore a solution is required to improve the quality of the aromatics fraction. As set forth in U.S. Pat. No. 10,053,401 (incorporated by reference herein in its entirety), hydrodearylation offers an approach to convert bridged noncondensed di- or multi-aromatics to mono-aromatics. Further, U.S. Pat. No. 10,093,873 (incorporated by reference herein in its entirety) contemplates returning aromatic bottoms to the atmospheric distillation unit. However, given the temperatures therein and the fractioning of heavier hydrocarbons (e.g. $C_{9+}$) in a diesel fraction, heavier compounds returned to the ADU may be fractioned therewith. As such, a further approach is needed to recover or obtain higher value mono-aromatics (e.g. benzene, toluene and xylene "BTX") from a refinery complex.

Accordingly, ongoing needs exist deriving and/or recovering higher value hydrocarbons from the refining complex and for reducing waste and/or production of low value hydrocarbons. The present disclosure achieves such by recycling the heavier aromatics back into the system to be processed further.

The present disclosure provides a method to increase recovery of benzene, toluene and xylene. The method may include supplying to a naphtha reforming unit (NREF) a stream of hydrotreated naphtha and then allowing the stream to flow through the NREF to generate reformate and hydrogen gas. At least a portion of reformate is then supplied from the NREF to an aromatics recovery complex (ARC). A portion of the reformate then may flow in the ARC through a reformate splitter to generate a $C_{8+}$ stream. The $C_{8+}$ stream may then flow through a xylene re-run splitter to obtain a $C_8$ stream and a $C_{9+}$ stream. The $C_{9+}$ stream may then be redirected back to enter the stream of hydrotreated naphtha to thereby reprocess the $C_{9+}$ stream and recover a higher yield of benzene, toluene and xylene.

In some instances, the $C_{9+}$ stream is recycled to the stream of hydrotreated naphtha prior to entering the NREF. In other instances, the $C_{9+}$ stream is recycled to the stream of hydrotreated naphtha within the NREF.

In certain aspects, the $C_{9+}$ stream feeds into the NREF equally before each reactor unit contained therein. In other aspects, the NREF provides a temperature and a catalyst suitable to provide sufficient energy to sever an alkyl carbon-carbon bond, such as from about 490° C. to about 520° C. In some instances, the catalyst in the NREF includes an acidic catalyst.

The present disclosure may further include flowing the $C_8$ stream to a para-xylene extraction unit to obtain a para-xylene stream and a xylene isomer stream. The xylene isomer stream may then flow to a xylene isomerization unit coupled to a further splitter. The xylene isomer stream may then be recycled to the xylene re-run splitter to provide further $C_{9+}$ compounds to join the $C_{9+}$ stream.

In some aspects, the catalyst of the NREF is selected from a zeolite, a platinum compound, a palladium compound or combinations thereof. In some instances, a zeolite may feature a framework selected from Faujasite (FAU), beta (BEA), Mordenite (MOR), Mordenite Framework Inverted (MFI) or combinations thereof.

In other aspects, the NREF may have a hydrogen/oil operating ratio of about 100 to about 2500 L/L, including of about 100 to about 1000 L/L and of about 100 to about 750 L/L. In some aspects, the NREF may have an operating LHSV of about 0.5 to about 40 $h^{-1}$, including of about 0.5 to about 10 $h^{-1}$ and about 0.5 to about 4 $h^{-1}$. The NREF may further have an operating pressure of about 1 to about 50 bar, including of about 1 to about 30 bar and of about 1 to about 20 bar. The NREF may further have an operating temperature of about 250 to about 575° C., including of about 400 to about 575° C. and of about 450 to about 575° C.

Additional features and advantages of the described embodiments will be set forth in the detailed description, which follows, and in part will be readily apparent to those skilled in the art from that description or recognized by practicing the described embodiments, including the detailed description, which follows, the claims, as well as the appended drawings.

Figure 1:
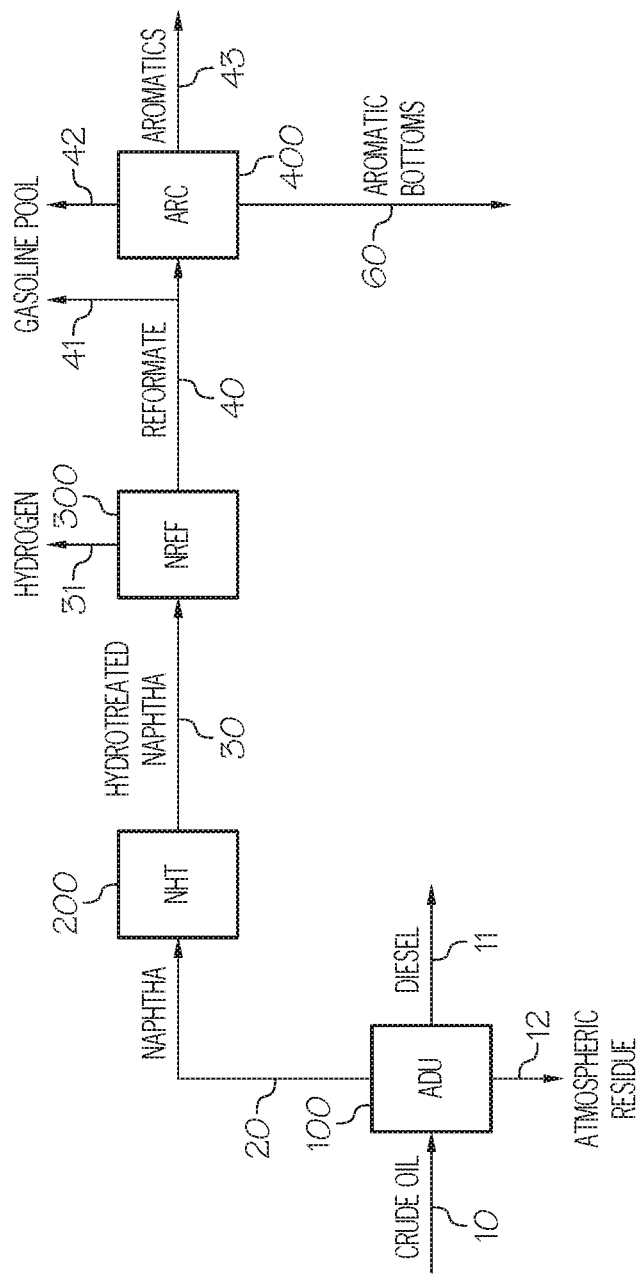
FIG. 1 shows a schematic overview of a typical refinery arrangement of systems.

The embodiments set forth in the drawing are illustrative in nature and not intended to be limiting to the claims. Moreover, individual features of the drawing will be more fully apparent and understood in view of the detailed description.

DETAILED DESCRIPTION

As used herein, the term "aromatics" includes $C_6$-$C_8$ aromatics, such as, for example, benzene and xylenes, whereas "aromatic bottoms" refer to the heavier fraction of $C_{9+}$ compounds, including but not limited to $C_9$, $C_{10}$, $C_{11}$, $C_{12}$, $C_{13}$, $C_{14}$, $C_{15}$, and $C_{16}$ compounds.

Figure 2:
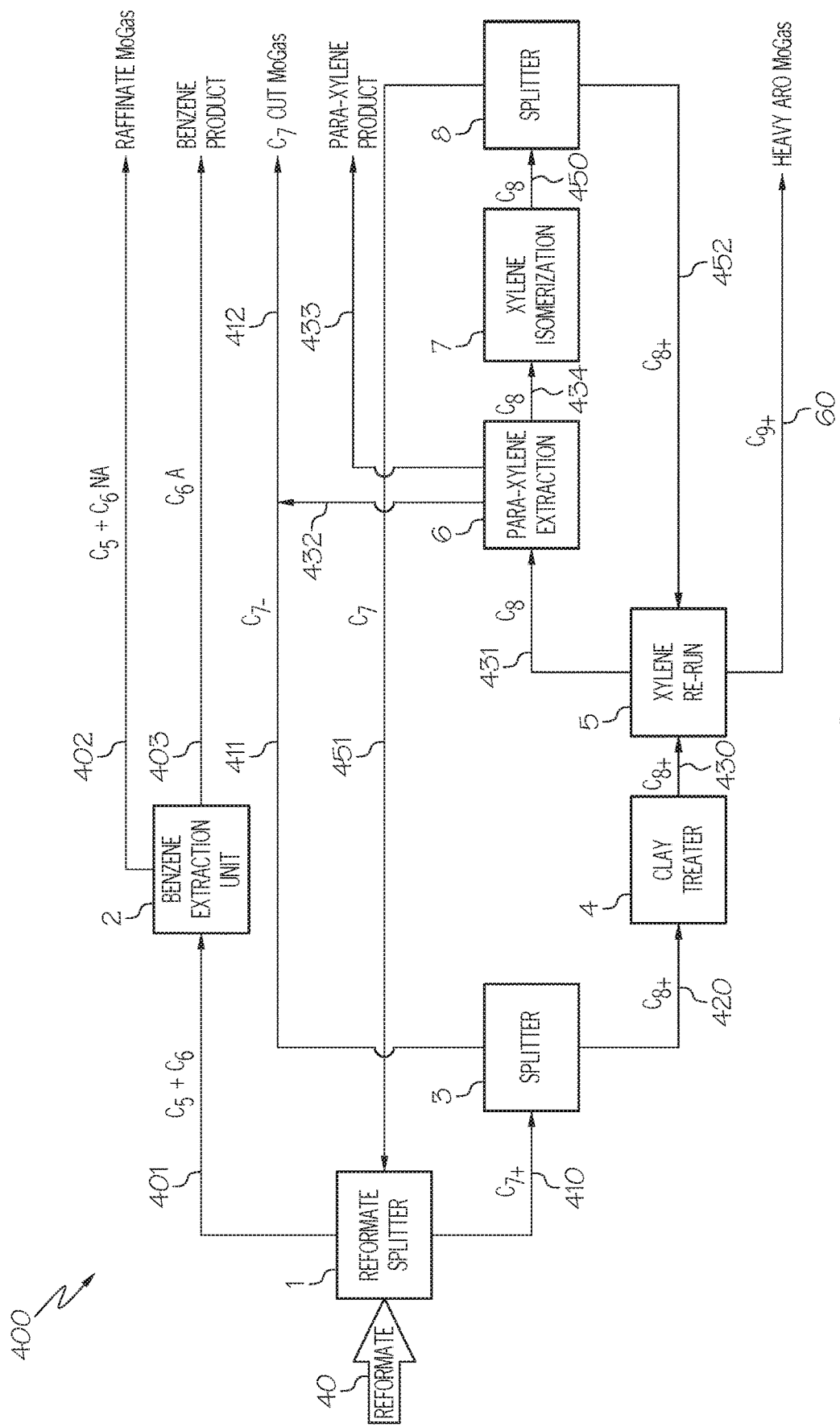
FIG. 2 shows a more detailed schematic of the various processing units present in a typical aromatics recovery complex.

A typical refinery complex is presented in FIG. 1 and a closer schematic of an aromatics recovery complex (ARC) from such is depicted in FIG. 2. The crude oil feed is distilled in an atmospheric distillation unit (ADU) to recover a naphtha fraction boiling in the range 36-180° C., a diesel fraction boiling in the range 180-370° C. and an atmospheric residue fraction boiling at 370° C. and higher. The naphtha fraction is then hydrotreated in a naphtha hydrotreating unit (NHT) to reduce the sulfur and nitrogen content to less than 0.5 ppmw. In general, the operating conditions of a NHT include a temperature in the range of from about 260° C. to about 400° C.; a pressure in the range of from about 1 bar to about 50 bars; and an LHSV in the range of from about 0.5 $h^{-1}$ to about 40 $h^{-1}$.

The hydrotreated naphtha fraction is then sent to a catalytic reforming unit (NREF) to improve its quality, i.e., increase octane number to produce gasoline blending stream or feedstock for an aromatics recovery unit. Similarly, the diesel fraction is hydrotreated in a separate diesel hydrotreating unit (DHT) to desulfurize the diesel oil to obtain diesel fraction meeting the stringent specifications.

The atmospheric residue fraction is either used as a fuel oil component or sent to other separation/conversion units to convert them from low value hydrocarbons to various fuel oil products.

The reformate fraction from the catalytic reforming unit can be used as a gasoline blending component or sent to an aromatic recovery complex (ARC) to recover high value aromatics, i.e., benzene, toluene, and xylenes, commonly called BTX. FIG. 2 shows more detail of the processes present in an aromatic recovery complex (ARC). The reformate stream flowing from the catalytic reforming unit is split into two fractions: light ($C_5$, $C_6$) and heavy ($C_{7+}$) reformate. The light reformate is sent to a benzene extraction unit to extract benzene present therein and recover near benzene free gasoline. The heavy reformate stream is then sent to a second splitter to recover $C_7$ and a $C_{8+}$ stream. The $C_7$ toluene stream is sent to a gasoline pool or other interconversion processes and the $C_{8+}$ stream is sent to a clay tower to remove olefins. The olefin-free effluent is then sent to a xylene re-run splitter/fractionator to send the $C_8$ stream to a para-xylene extraction unit to recover para-xylene. Other xylenes are also recovered during this latter process and are further sent to a xylene isomerization unit to catalytically convert them to para-xylene. The successfully converted fraction is recycled back to para-xylene extraction unit for distillation. The heavy fraction from the xylene re-run unit is recovered as process reject stream or aromatic bottoms of $C_{9+}$ hydrocarbons.

Toluene is recovered as a separate fraction, and then may be converted into higher value products, for example benzene in addition to or alternative to xylenes. One toluene conversion process involves the disproportionation of toluene to make benzene and xylenes. Another process involves the hydrodealkylation of toluene to make benzene. Both toluene disproportionation and toluene hydrodealkylation result in the formation of benzene. With the current and continued environmental regulations involving benzene, it is desirable that the toluene conversion not result in the formation of significant quantities of benzene.

One problem faced by refineries is how to most economically reduce the benzene content in the reformate products sent to the gasoline pool by improving the processes and apparatus of systems described above. In some refineries, the aromatic complex bottoms are added to the gasoline fraction. However, the aromatic complex bottoms deteriorate the gasoline quality and in the long run impact the engine performance negatively.

The present disclosure concerns the identification that recycling the aromatic bottoms of $C_{9+}$ alkylaromatic compounds generated from the ARC (i.e. at the xylene re-run unit or from a transalkylation unit) back to the catalytic reformer (FIG. 3) presents an opportunity to further generate higher value compounds rather than waste or redistribution to gasoline pools. Particularly, as described herein, the NREF may operate at temperatures of about 490 to about 575° C. and utilize an acidic catalyst. Collectively, these two features provide sufficient energy and opportunity for a carbon-carbon alkyl bond to be severed and to fracture or cleave di- or multi-aromatic compounds in the $C_{9+}$ stream into mono-aromatics. Generating such in the NREF allows higher value aromatics to flow to the aromatics recovery complex and be isolated/recovered therein rather than be discarded as would happen in the first pass through. It should therefore be apparent to one skilled in the art that such recycling or recirculation can continue to exhaustion.

The aromatic bottoms can be recycled to enter the catalytic reformer at one or multiple points. As identified in FIGS. 4 and 5, the NREF can possess multiple reactors and multiple furnaces. Accordingly, the $C_{9+}$ stream of aromatic bottoms can enter the NREF at one or multiple points therein. One point of entry is to rejoin the hydrotreated naphtha stream emerging from the NHT prior to entry to the NREF. The only parameter that may be impacted by returning the aromatic bottoms to the NREF is the liquid hourly space velocity ("LHSV") as the added line increases the feed into the respective reforming unit.

Figure 4:
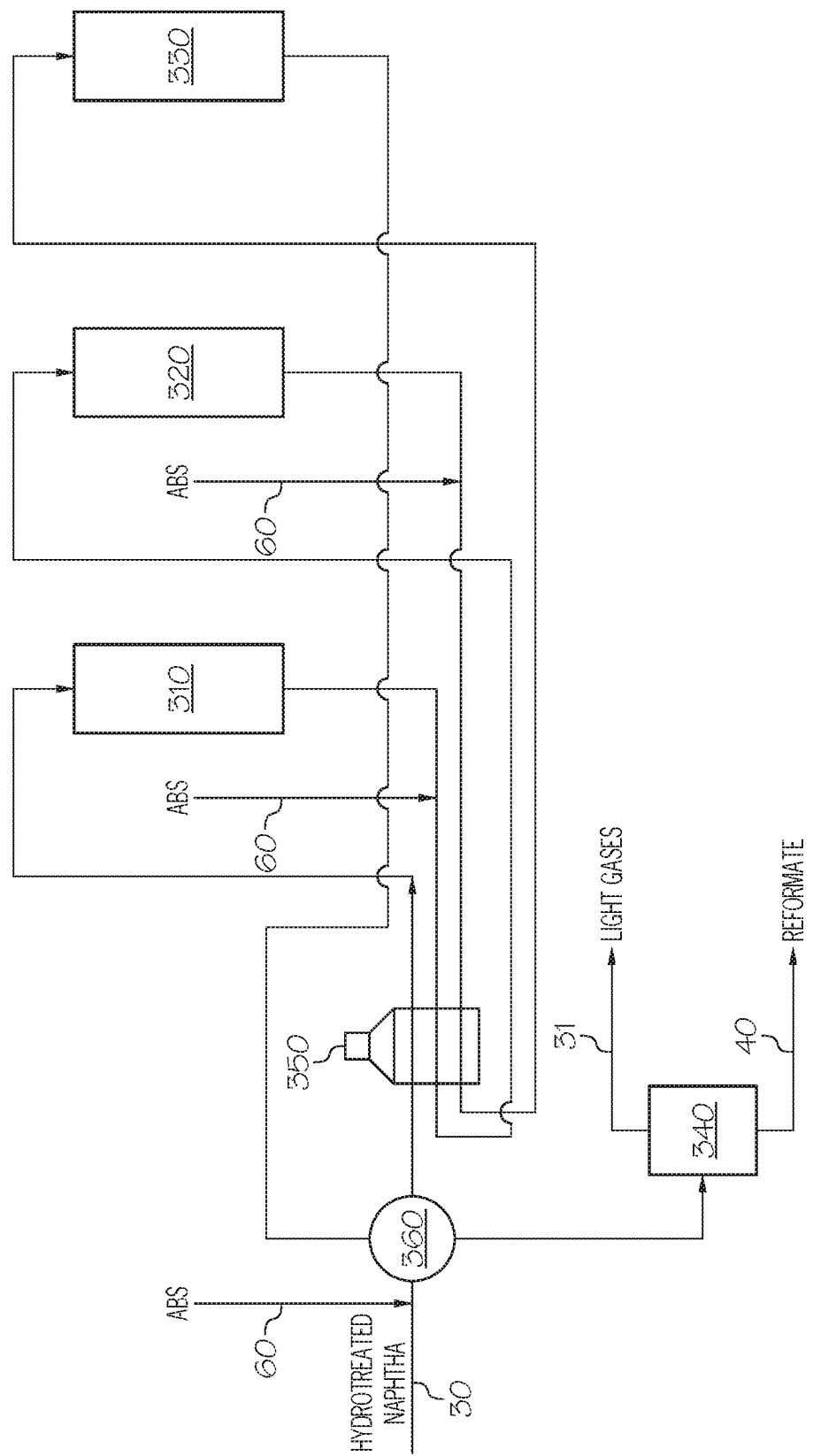
FIG. 4 shows in greater detail possible inputs for the aromatic bottoms $C_{9+}$ hydrocarbons back into a fixed bed catalytic reformer.
Figure 5:
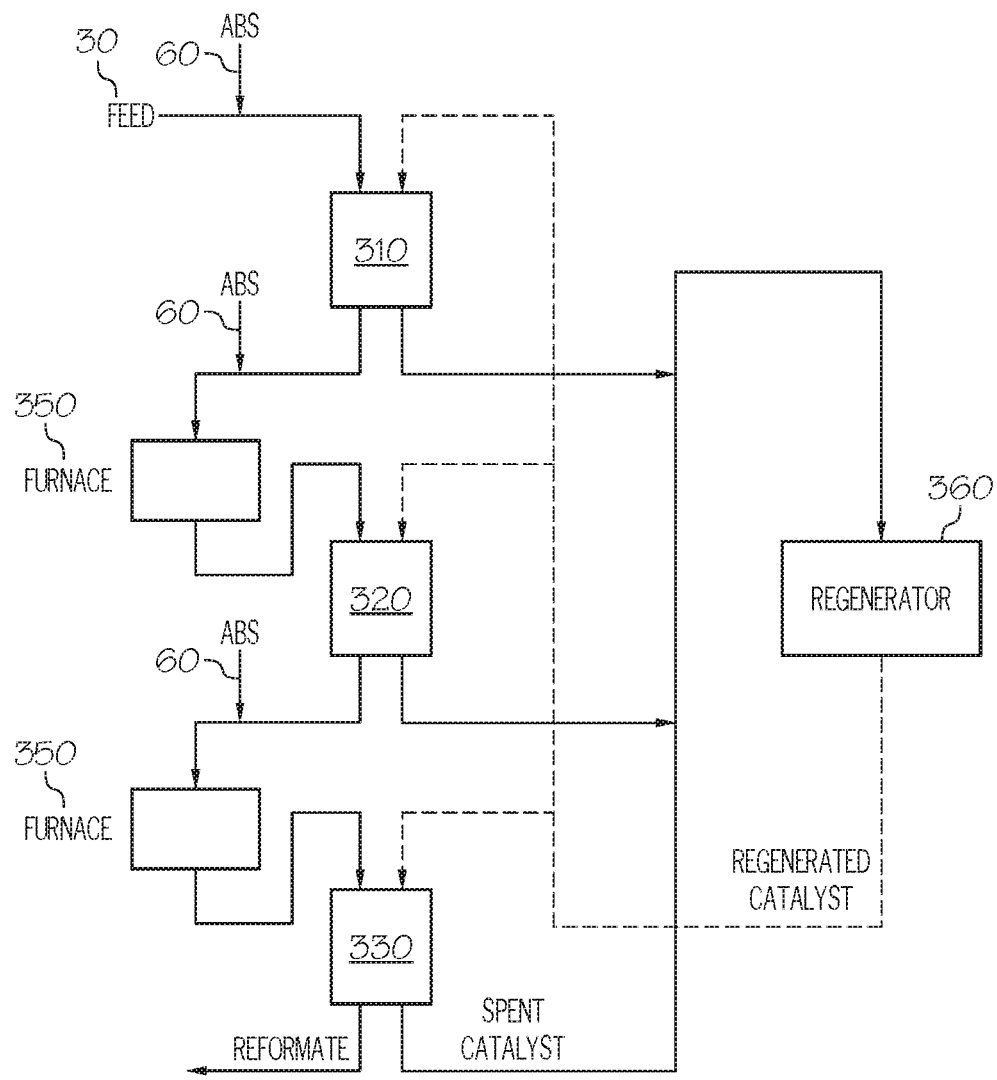
FIG. 5 shows in greater detail possible inputs for the aromatic bottoms $C_{9+}$ hydrocarbons back into a circulating catalytic reformer.

Further, as set forth in FIGS. 4 and 5, the hydrotreated naphtha stream can flow through three or more reactors, passing through a furnace before entering each reactor. The $C_{9+}$ stream, in addition or in lieu of joining the hydrotreated naphtha at or before entry to the NREF, may be inserted prior to a stream feeding into a furnace within the NREF or upon exit from a reactor with the NREF. As further depicted in FIG. 5, the reactors are connected to a regenerator to turn over spent catalyst. There are several types of process configurations which differ how they regenerate the reforming catalyst. Catalyst regeneration, which involves combusting detrimental coke in the presence of oxygen, includes a semi-regenerative process, cyclic regeneration, and continuous regeneration. Semi-regeneration involves the entire unit, including all reactors in the series, to be shut-down for catalyst regeneration. Cyclic configurations utilize an additional "swing" reactor to permit one reactor at a time to be taken off-line for regeneration while the others remain in service. Continuous catalyst regeneration configurations provide for essentially uninterrupted operation by catalyst removal, regeneration and replacement.

Referring first to FIG. 1, a schematic of a conventional system for gasoline and aromatic production is shown. In the embodiment of FIG. 1, a refinery with an aromatic complex is presented. In a refining system, a crude oil inlet stream 10 is fluidly coupled to atmospheric distillation unit (ADU) 100, and crude oil from the crude oil inlet stream 10 is separated into naphtha stream 20, atmospheric residue stream 12, and diesel stream 11. Diesel stream 11 proceeds to diesel hydrotreating unit (DHT) (not shown), and naphtha stream 20 proceeds to naphtha hydrotreating unit (NHT) 200. A hydrotreated naphtha stream 30 exits NHT 200 and enters catalytic naphtha reforming unit (NREF) 300. A separated hydrogen stream 31 exits NREF 300, and a reformate stream 40 also exits NREF 300. A portion of reformate stream 40 enters aromatic complex (ARC) 400, and another portion of reformate stream 40 is separated by pool stream 41 to a gasoline pool. The ARC 400 separates the reformate into a pool stream 42 (e.g., $C_4$-$C_{10}$ non-aromatics), an aromatics stream ($C_6$-$C_8$ aromatics) 43, and an aromatic bottoms stream ($C_{9+}$) 60.

The crude oil is distilled in ADU 100 to recover naphtha, which boils in the range of about 36° C. to about 180° C., and diesel, which boils in the range of about 180° C. to about 370° C. An atmospheric residue fraction in atmospheric residue stream 12 boils at about 370° C. and higher. Naphtha stream 20 is hydrotreated in NHT 200 to reduce the sulfur and nitrogen content to less than about 0.5 ppmw, and the hydrotreated naphtha stream 30 is sent to NREF 300 to improve its quality, or in other words increase the octane number to produce gasoline blending stream or feedstock for an aromatics recovery unit. Diesel stream 11 is hydrotreated in DHT to desulfurize the diesel oil to obtain a diesel fraction meeting stringent specifications at ultra-low sulfur diesel (ULSD). An atmospheric residue fraction is either used as a fuel oil component or sent to other separation or conversion units to convert low value hydrocarbons to high value products. Reformate stream 40 from NREF 300 can be used as a gasoline blending component or sent to an aromatic complex, such as ARC 400, to recover high value aromatics, such as benzene, toluene, and xylenes (BTX).

Referring to FIG. 2, an overview of an ARC 400, is shown. The reformate stream 40 from the NREF 300 of FIG. 1 flows initially into a reformate splitter 1 to separate into a light $C_5$ and $C_6$ hydrocarbon stream 401 and a heavy $C_{7+}$ stream 410. The $C_5$ and $C_6$ stream 401 feeds to a benzene extraction unit 2 to separate into $C_5$ and $C_6$ non-aromatic stream 402 for raffinate motor gasoline (MoGas) and a C6 aromatics stream 403 for benzene products. The $C_{7+}$ stream 410 feeds to a splitter 3 to produce a C7 cut MoGas stream 411 and a $C_{8+}$ hydrocarbon stream 420.

The $C_{8+}$ stream 420 is run through a clay treater 4 and then streamed 430 to a xylene re-run unit 5 to separate $C_{8+}$ hydrocarbons into a $C_8$ hydrocarbon stream 431 and $C_{9+}$ (heavy aromatic MoGas) hydrocarbon stream 60. The xylene-re-run unit 5 is a distillation column including trays and/or structured packing and/or random packing to fractionate mixed xylenes from heavier aromatics. The $C_8$ hydrocarbon stream 431 proceeds to a para-xylene extraction unit 6 to recover para-xylene in a para-xylene product stream 433. The para-xylene extraction unit 6 also produces a $C_7$ cut MoGas stream 432, which combines with $C_7$ cut MoGas stream 411 to produce $C_7$ cut MoGas stream 412. Other xylenes are recovered and sent to xylene isomerization unit 7 by stream 434 to convert them to para-xylene. The isomerization unit 7 includes a catalyst, such as a zeolite, that assists in transforming ortho- and meta-xylenes to para-xylene. The isomerized xylenes are sent to a splitter column 8. The converted fraction is recycled back to para-xylene extraction unit 6 from splitter column 8 by way of streams 452 and 431. Splitter top stream 451 is recycled back to reformate splitter 1. The heavy fraction from the xylene rerun unit 5 is recovered as aromatic bottoms (shown as $C_{9+}$ and Hvy Aro MoGas in FIG. 2 at stream 60).

Figure 3:
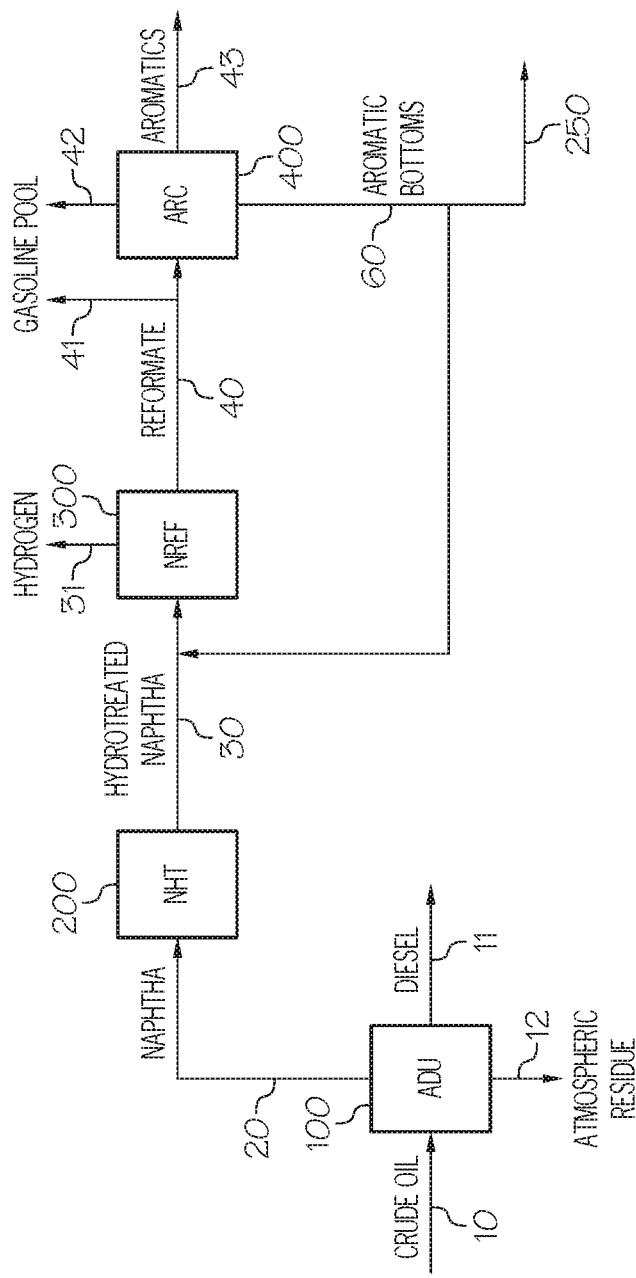
FIG. 3 shows a schematic of an example of the present disclosure, wherein an aromatic bottoms stream of $C_{9+}$ hydrocarbons from the aromatics recovery complex is recycled back to the hydrotreated naphtha feed into the catalytic reformer.

Referring to FIG. 3, a schematic is shown of one aspect of the present disclosure, in which the aromatic bottoms stream 60 is recycled and fed back into the catalytic reforming unit 300. Aromatic bottoms relate to $C_{9+}$ aromatics and may be a more complex mixture of compounds including di-aromatics. $C_{9+}$ aromatics boil in the range of about 100° C. to about 450° C.

Aromatics bottoms at stream 60 are recycled to the NREF 300 for full extinction or partially if a bleed stream 250 is required. Recycled aromatics bottoms at stream 60 will not substantially change the operating conditions, as the stream 60 enters at a temperature in the naphtha and gasoline boiling range. The liquid hourly space velocity ("LHSV") may be impacted, as there will be increased feed to the respective reforming unit.

Referring to FIG. 4, a more detailed view of the NREF is seen, with the aromatic bottom stream 60 flowing from the ARC back into the NREF. The bottoms stream 60 may enter the NREF at one, two or three points. The NREF features three reactors 310 320 330 and a furnace 350 or multiple furnaces placed in between. The multiple reactors may be used due to the endothermicity of the reaction and catalyst deactivation in each reactor. The effluents are heated to the reaction temperature by the furnace and send to the next reactor. The hydrotreated naphtha 30 enters from the NHT and passes through the heat exchanges 360 furnace 350 and into the first reactor 310. The reaction passes back through the furnace 350 and to the second reactor 320. The reactants pass back through the furnace 350 and into the third reactor 330 and then passes through the heat exchanger 360 and to a splitter 340 to separate light gases 31 and reformate 40, which flows to the ARC 400.

FIG. 5 shows a slightly different arrangement of the NREF, with independent furnaces 350 placed between the reactors 310 320 330. Also depicted are feeds for catalyst regeneration through feeding spent catalyst to a regenerator 360 and then back to each reactor. As with FIG. 4, an aromatic bottoms stream of $C_{9+}$ hydrocarbons can enter the NREF prior to entry in the first reactor 310, the second reactor 320 or the third reactor 330.

According to an aspect, either alone or in combination with any other aspect, a method for recovery of benzene, toluene and xylene, includes: supplying to a naphtha reforming unit (NREF) a stream of hydrotreated naphtha; allowing the stream to flow through the NREF to generate reformate and hydrogen gas; supplying at least a portion of reformate from the NREF to an aromatics recovery complex (ARC); flowing the portion of reformate in the ARC through a reformate splitter to generate a $C_{7+}$ stream; flowing the $C_{7+}$ stream through a second splitter to generate a $C_{8+}$ stream; flowing the $C_{8+}$ stream through a clay tower to deolefinate the $C_{8+}$ stream; flowing the deolefinated $C_{8+}$ stream through a xylene re-run splitter to obtain a $C_8$ stream and a $C_{9+}$ stream; and recycling the $C_{9+}$ stream back to enter the stream of hydrotreated naphtha to thereby reprocess the $C_{9+}$ stream to recover benzene, toluene and xylene.

According to a second aspect, either alone or in combination with any other aspect, the $C_{9+}$ stream recycles to the stream of hydrotreated naphtha prior to entering the NREF.

According to a third aspect, either alone or in combination with any other aspect, the $C_{9+}$ stream recycles to the stream of hydrotreated naphtha within the NREF.

According to a fourth aspect, either alone or in combination with any other aspect, the $C_{9+}$ stream feeds into the NREF equally before each reactor unit contained therein.

According to a fifth aspect, either alone or in combination with any other aspect, the NREF comprises a temperature and a catalyst suitable to provide sufficient energy to break an alkyl carbon-carbon bond.

According to a sixth aspect, either alone or in combination with any other aspect, the operating temperature of the NREF is from about 490° C. to about 520° C.

According to a seventh aspect, either alone or in combination with any other aspect, the catalyst of the NREF is an acidic catalyst.

According to an eighth aspect, either alone or in combination with any other aspect, the catalyst is selected from a zeolite, a platinum compound, a palladium compound or combinations thereof.

According to a ninth aspect, either alone or in combination with any other aspect, the catalyst is a zeolite with a framework selected from Faujasite (FAU) (zeolite Y, USY), Beta (*BEA), Mordenite (MOR), ZSM-5 (MFI) or combinations thereof.

According to a tenth aspect, either alone or in combination with any other aspect, the method may also include: flowing the $C_8$ stream to a para-xylene extraction unit to obtain a para-xylene stream and a xylene isomer stream; flowing the xylene isomer stream to a xylene isomerization unit coupled to a further splitter; and recycling the xylene isomer stream to the xylene re-run splitter, wherein further $C_{9+}$ compounds join the $C_{9+}$ stream.

According to an eleventh aspect, either alone or in combination with any other aspect, the NREF has a hydrogen/oil operating ratio of about 100 to about 2500 L/L.

According to a twelfth aspect, either alone or in combination with any other aspect, the NREF has a hydrogen/oil operating ratio of about 100 to about 1000 L/L.

According to a thirteenth aspect, either alone or in combination with any other aspect, the NREF has a hydrogen/oil operating ratio of about 100 to about 750 L/L According to a fourteenth aspect, either alone or in combination with any other aspect, the NREF has an operating LHSV of about 0.5 to about 40 $h^{-1}$.

According to a fifteenth aspect, either alone or in combination with any other aspect, the NREF has an operating LHSV of about 0.5 to about 10 $h^{-1}$.

According to a sixteenth aspect, either alone or in combination with any other aspect, the NREF has an operating LHSV of about 0.5 to about 4 $h^{-1}$.

According to a seventeenth aspect, either alone or in combination with any other aspect, the NREF has an operating pressure of about 1 to about 50 bar.

According to an eighteenth aspect, either alone or in combination with any other aspect, the NREF has an operating pressure of about 1 to about 20 bar.

According to a nineteenth aspect, either alone or in combination with any other aspect, the NREF has an operating temperature of about 250 to about 560° C.

According to a twentieth aspect, either alone or in combination with any other aspect, the NREF has an operating temperature of about 450 to about 560° C.

EXAMPLES

One or more of the previously described features will be further illustrated in the following example simulations using Arab light crude oil. The reformer was arranged as follows:

| Hydrogen/Oil | L/L | 625 |
| LHSV | $h^{-1}$ | 4 |
| Pressure | Bar | 3 |
| Temperature | ° C. | 520 | with a catalyst of Pt on alumina, that is chlorinated in the process. The naphtha hydrotreater was arranged as follows:

| Hydrogen/Oil | L/L | 200 |
| LHSV | $h^{-1}$ | 6 |
| Pressure | Bar | 20 |
| Temperature | ° C. | 300 | with a catalyst of Co—Mo on alumina. By recycling, the LHSV for the reformer increased from 4 to 4.5 $h^{-1}$.

The difference between the two arrangements depicted in FIGS. 1 (Comparative Example A) and 3 (Inventive Example 1) were assessed for notable differences obtained by returning the $C_{9+}$ stream of aromatic bottoms back to the NREF. The details are presented in Table 1 below.

| Stream | Name | Units | Comparative Example A | Inventive Example 1 |
|---|---|---|---|---|
| 10 | Crude Oil | KBPSD | 400.0 | 400.0 |
| 60 | ARC Bottoms | KBPSD | 7.9 | 7.0 |
| 20 | Naphtha to hydrotreater | KBPSD | 67.0 | 67.0 |
| 11 | Atmospheric Residue | KBPSD | 200.5 | 200.5 |
| 30 | Hydrotreated Naphtha | KBPSD | 66.2 | 74.2 |
| 11 | Diesel | KBPSD | 164.2 | 164.2 |
| 40 | Reformate | KBPSD | 53.0 | 60.9 |
| 43 | Aromatics (BTX) | Mtons/D | 4.2 | 4.8 |

*KBPSD-kilo barrels per stream day.

The returning line of the aromatic bottoms to the NREF caused an 11% decline in the amount of ARC bottoms present, while allowing almost a 14% increase in BTX production. This also minimizes $C_{9+}$ production, which in turn minimizes the heavy ends in the gasoline as $C_{9+}$ is no longer available to be added to the gasoline. Further, with this scheme, existing refinery equipment may be used without any further need to install additional process units to process this heavy stream.

What is claimed is:

1. A method for recovery of benzene, toluene and xylene, the method comprising:
   supplying to a naphtha reforming unit (NREF) a stream of hydrotreated naphtha, wherein the NREF comprises more than one reactor unit connected in series;
   allowing the stream of hydrotreated naphtha to flow through the NREF to generate a reformate and hydrogen gas;
   supplying at least a portion of the reformate from the NREF to an aromatics recovery complex (ARC);
   flowing the portion of the reformate in the ARC through a reformate splitter to generate a $C_{7+}$ stream;
   flowing the $C_{7+}$ stream through a second splitter to generate a $C_{8+}$ stream;
   flowing the $C_{8+}$ stream through a clay tower to deolefinate the $C_{8+}$ stream;
   flowing the deolefinated $C_{8+}$ stream through a xylene re-run splitter to obtain a $C_8$ stream and a $C_{9+}$ stream; and
   recycling the $C_{9+}$ stream to the stream of hydrotreated naphtha to thereby reprocess the $C_{9+}$ stream to recover benzene, toluene and xylene, wherein the $C_{9+}$ stream is fed at least partly into each reactor unit within the NREF.

2. The method of claim 1, wherein the $C_{9+}$ stream is partly recycled to the stream of hydrotreated naphtha prior to entering the NREF.

3. The method of claim 1, wherein the $C_{9+}$ stream is partly recycled to the stream of hydrotreated naphtha within the NREF.

4. The method of claim 1, wherein the NREF comprises a temperature and a catalyst suitable to provide sufficient energy to break an alkyl carbon-carbon bond.

5. The method of claim 4, wherein the temperature of the NREF is from about 490° C. to about 520° C.

6. The method of claim 4, wherein the catalyst comprises an acidic catalyst.

7. The method of claim 4, wherein the catalyst is selected from the group consisting of a zeolite, a platinum compound, a palladium compound or combinations thereof.

8. The method of claim 4, wherein the catalyst is a zeolite with a framework selected from the group consisting of Faujasite (FAU), Beta (BEA), Mordenite (MOR), ZSM-5 (MEI) or combinations thereof.

9. The method of claim 1, further comprising:
   flowing the $C_8$ stream to a para-xylene extraction unit to obtain a para-xylene stream and a xylene isomer stream;

flowing the xylene isomer stream to a xylene isomerization unit coupled to a further splitter; and recycling an effluent from the xylene isomerization unit to the xylene re-run splitter, wherein further $C_{9+}$ compounds join the $C_{9+}$ stream.

10. The method of claim 1, wherein the NREF has a hydrogen/oil operating ratio of about 100 to about 2500 L/L.

11. The method of claim 10, wherein the hydrogen/oil operating ratio is about 100 to about 1000 L/L.

12. The method of claim 10, wherein the hydrogen/oil operating ratio is about 100 to about 750 L/L.

13. The method of claim 1, wherein the NREF has an operating liquid hourly space velocity (LHSV) of about 0.5 to about 40 $h^{-1}$.

14. The method of claim 13, wherein the NREF has an operating LHSV of about 0.5 to about 10 $h^{-1}$.

15. The method of claim 13, wherein the NREF has an operating LHSV of about 0.5 to about 4 $h^{-1}$.

16. The method of claim 1, wherein the NREF has an operating pressure of about 1 to about 50 bar.

17. The method of claim 16, wherein the NREF has an operating pressure of about 1 to about 20 bar.

18. The method of claim 1, wherein the NREF has an operating temperature of about 250 to about 560° C.

19. The method of claim 18, wherein the NREF has an operating temperature of about 450 to about 560° C.

* * * * *